United States Patent [19]

Hsieh

[11] 4,138,536

[45] Feb. 6, 1979

[54] POLYMERIZATION OF 1,3-CYCLODIENE WITH VINYLAROMATIC HYDROCARBON

[75] Inventor: Henry L. Hsieh, Bartlesville, Okla.

[73] Assignee: Phillips Petroleum Company, Bartlesville, Okla.

[21] Appl. No.: 851,649

[22] Filed: Nov. 15, 1977

Related U.S. Application Data

[63] Continuation of Ser. No. 751,861, Dec. 20, 1976, abandoned, which is a continuation of Ser. No. 583,721, Jun. 4, 1975, abandoned, which is a continuation-in-part of Ser. No. 449,642, Mar. 11, 1974, abandoned.

[51] Int. Cl.² ............... C08F 4/08; C08F 8/04; C08F 212/08; C08F 232/06
[52] U.S. Cl. ............... 526/19; 260/30.4 A; 260/880 B; 526/25; 526/26; 526/84; 526/173; 526/180; 526/181; 526/283; 526/293; 526/308
[58] Field of Search ............ 260/880 B; 526/19, 25, 526/26, 173, 180, 181, 283, 293, 308

[56] References Cited

U.S. PATENT DOCUMENTS

| | | | |
|---|---|---|---|
| 2,560,492 | 7/1951 | Sparks et al. | 260/83.7 |
| 3,598,795 | 4/1971 | Van den Berg et al. | 260/84.1 |
| 3,668,263 | 6/1972 | Morrison et al. | 260/665 R |
| 3,716,495 | 2/1973 | Hsieh | 252/431 C |
| 3,776,893 | 12/1973 | Naylor et al. | 260/83.7 |
| 3,776,964 | 12/1973 | Morrison et al. | 260/665 R |
| 3,787,510 | 1/1974 | Farrar | 260/665 R |
| 3,842,145 | 10/1974 | Hsieh | 260/879 |

FOREIGN PATENT DOCUMENTS

199393  7/1967  U.S.S.R.

OTHER PUBLICATIONS

Polymer Chemistry of Synthetic Elastomers, Forman, Part II (Interscience, 1969), pp. 491–596.
Vinyl Polymerization, Part II (Marcel Dekker, N.Y., 1969), pp. 211–229.
Fortschritte der Hochpolymeren, Bywater, 4 (1965), pp. 66–110.

*Primary Examiner*—Stanford M. Levin

[57] ABSTRACT

A 1,3-cyclodiene is polymerized with a vinylaromatic hydrocarbon in the presence of a paraffin or cycloparaffin hydrocarbon diluent and an organolithium initiator. Further, polymerization of a 1,3-cyclodiene with a vinylaromatic hydrocarbon employing an organolithium initiator having a functionally greater than 1 produces a new and useful copolymer. Hydrogenated copolymers are provided.

44 Claims, No Drawings

POLYMERIZATION OF 1,3-CYCLODIENE WITH VINYLAROMATIC HYDROCARBON

This application is a continuation of copending application Ser. No. 751,861, filed Dec. 20, 1976, now abandoned which is a continuation of Ser. No. 583,721, filed June 4, 1975, now abandoned, which is a continuation-in-part of application Ser. No. 449,642, filed Mar. 11, 1974, now abandoned.

BACKGROUND

The invention relates to processes for the polymerization of 1,3-cyclodienes with vinylaromatic hydrocarbon compounds and to the copolymers produced therefrom.

Some copolymers of 1,3-cyclodienes with vinylaromatic hydrocarbons such as 1,3-cyclohexadiene and styrene have been disclosed in recent years. While this basic copolymer, that is, the copolymer formed by polymerizing styrene with 1,3-cyclohexadiene employing a monofunctional organolithium initiator, has been previously disclosed, little has been known about the product or the process and the effect various parameters have on the reaction. It has now been discovered that higher conversions than heretofore possible can be achieved by choosing a particular diluent for the reaction mixture. Further, a 1,3-cyclodiene/vinylaromatic copolymer having higher tensile strength than heretofore possible has been discovered.

It is an object of the invention to provide an improved method for the polymerization of 1,3-cyclodienes and vinylaromatic hydrocarbons. Another object of the invention is to provide a method to improve the polymerization rate and the percent of conversion to copolymer. Still another object of the invention is to provide a 1,3-cyclodiene/vinylaromatic hydrocarbon copolymer. Other objects, aspects and advantages of this invention will be apparent to one skilled in the art upon studying the specification and the appended claims.

SUMMARY

According to the invention, a 1,3-cyclodiene is polymerized with a vinylaromatic hydrocarbon in the presence of a diluent selected from a group consisting of linear and branched paraffin and cycloparaffin hydrocarbons of 4 to 12 carbon atoms per molecule and an organolithium initiator.

Further according to the invention a 1,3-cyclodiene is polymerized with a vinylaromatic hydrocarbon in the presence of an organolithium initiator wherein said organolithium initiator has a lithium functionality greater than 1, the copolymer having improved tensile strength as compared to such copolymers produced employing organolithium initiators having a lithium functionality equal to 1.

A copolymer is produced by polymerizing a 1,3-cyclodiene with a vinylaromatic hydrocarbon in the presence of an organolithium initiator wherein the organolithium initiator has a lithium functionality greater than 1, the copolymer having improved tensile strength as compared to such copolymers produced employing lithium initiators having a lithium functionality equal to 1.

DETAILED DESCRIPTION OF THE INVENTION

It has been discovered in polymerizing a 1,3-cyclodiene with a vinylaromatic hydrocarbon in the presence of an organolithium initiator that the particular diluent used has a significant effect on the reaction. In particular, linear and branched paraffin and cycloparaffin hydrocarbons of 4 to 12 carbon atoms per molecule produce an unexpected increase in conversion over previously used aromatic hydrocarbon diluents.

It has also been discovered that copolymerizing a 1,3-cyclodiene and a vinylaromatic hydrocarbon with an organolithium initiator having a lithium functionality greater than 1 produces a copolymer having improved tensile strength as compared to such copolymers produced with organolithium initiators having a lithium functionality equal to 1. As used herein the term lithium functionality means the number of carbon-lithium (C-Li) groups in an organolithium initiator which are capable of participating in the polymerization reaction. For example, one of the preferred organolithium initiators suitable for use in the invention is a composition consisting primarily of 1,3-bis(1-lithio-3-methylpentyl)-benzene which is more fully described herein and which has a lithium functionality ranging from about 2.1 to about 2.2

In the polymerization process of the invention, suitable 1,3-cyclodienes are represented by the formula

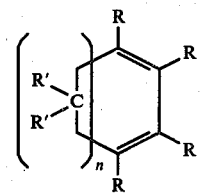

wherein n can be 1 or 2, each R group can be a hydrogen, methyl or ethyl radical and each R' group can be a hydrogen, alkyl, linear or branched or a cycloalkyl, or aryl radical such that the maximum number of carbon atoms per R' group is about 6. Both the R and R' groups can be the same or different radicals selected from their respective group. The total number of carbon atoms in the 1,3-cyclodiene monomer can be in the range of from about 5 to 20. Examples of such compounds include 1,3-cyclopentadiene, 2-methyl-1,3-cyclopentadiene, 5-ethyl-1,3-cyclopentadiene, 1,3-cyclohexadiene, 1-ethyl-1,3-cyclohexadiene, 1,4-dimethyl-5-isopropyl-1,3-cyclohexadiene, 2,3-dimethyl-5,6-diphenyl-1,3-cyclohexadiene, 2,3-diethyl-5-(n-butyl)-6-phenyl-1,3-cyclohexadiene, and 1-methyl-5-cyclohexyl-1,3-cyclohexadiene.

The vinylaromatic compounds suitable for use in the invention are compounds of carbon number in the range of from about 8 to 14. Some examples of such compounds in addition to styrene include the various alkyl styrenes such as 4-ethylstyrene, halostyrenes such as 2,3-dichlorostyrene and 1-vinylnaphthalene. It is within the scope of this invention to employ mixtures of the 1,3-cyclodienes and/or of the vinylaromatics.

The ratio of 1,3-cyclodiene to vinylaromatic hydrocarbon can vary throughout the entire range of combinations. Generally the 1,3-cyclodiene to vinylaromatic hydrocarbon is in the range of from about 1:99 to 99:1, more generally from about 95:5 to 25:75. However, the choice of ratio is governed by the polymer properties desired, i.e., increasing the 1,3-cyclodiene content raises the softening temperature of the polymer.

Diluents suitable for use in the present invention are selected from the group consisting of linear and branched paraffin and cycloparaffin hydrocarbons of 4 to 12 carbon atoms per molecule. Representative diluents include 2,3-dimethylbutane, n-heptane, 2,2,4-trimethylpentane, methylcyclopentane and cyclohexane. Cyclohexane is the preferred diluent because it promotes a higher conversion and reaction rate.

Organolithium compounds suitable for use in the polymerization have the formula $R''Li_x$, wherein $R''$ is a hydrocarbon radical selected from the group consisting of aliphatic, cycloaliphatic and aromatic radicals and x is an integer of 1 to 4, inclusive. The $R''$ group in the formula has a valence equal to the integer x and preferably contains from 1 to 20 carbon atoms, inclusive, although higher molecular weight compounds can be utilized. Examples of suitable organolithium compounds include methyllithium, isopropyllithium, butyllithium, t-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,5-dilithionaphthalene, 1,2-dilithio-1,2-diphenylethane, 9,10-dilithio-9,10-dihydroanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-trilithiodecane, 1,5,10,20-tetralithioeicosane, 1,2,3,5-tetralithiocyclohexane, and 1,2,3,5-tetralithio-4-hexylanthracene.

Other suitable organolithium treating agents are the alpha-lithio multi-substituted dialkylbenzenes and corresponding oligomers such as those represented by the formula

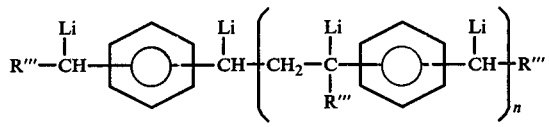

wherein $R'''$ is a linear or branched alkyl containing 2 to 12 carbon atoms, and n is an integer from 0 to 2. These compounds are usually used as a mixture in a suitable solvent; however, the mixture is primarily 1,3-bis-(1-lithio-3-methylpentyl)benzene referred to herein as DiLi-3. Additional information regarding such compounds can be found in U.S. Pat. No. 3,668,263, Morrison et al. (1972) and U.S. Pat. No. 3,776,964, Morrison et al. (1973).

The amount of initiator employed depends upon the polymer molecular weight desired and thus varies widely. Generally, the amount of initiator is in the range of from about 0.1–100 millimoles per 100 grams of total monomers.

In addition to the preference for cyclohexane as the diluent, it is preferred that the reaction be carried out in the presence of a small amount of an ether or a tertiary amine. The amount of the ether or tertiary amine recommended is in the range of from about 0.01 to 50 phm (parts by weight per hundred parts by weight monomers), preferably 0.1 to 10 phm. The presence of the ether or tertiary amine increases the percent of conversion and the polymerization rate and promotes the formation of conjugated diene blocks within the copolymer. Suitable ethers and tertiary amines include, for example, tetrahydrofuran, dioxane, dimethyl ether, diethyl ether, di-n-butyl ether, ethyl-n-butyl ether, anisole, diphenyl ether, triethylamine, N,N,N',N'-tetramethylethylenediamine, tri-n-propylamine and N,N-dimethylaniline.

The polymerization reaction can be carried out under autogeneous pressure or at any suitable pressure sufficient to maintain the reaction mixture substantially in the liquid phase. Higher pressures can be employed if desired, these pressures being obtained by some such suitable method as the pressurization of the reactor with a gas which is inert with respect to the polymerization reaction.

The polymerization temperature can vary broadly, but generally it is in the range of from about 0 to 300° F., preferably from about 30 to 150° F. The time required for the polymerization is dependent upon such factors as the molecular weight desired, quantity of catalyst employed, temperature, and the like, but generally is in the range from a few minutes to as long as 48 hours although longer polymerization periods can be employed. The process can be carried out batchwise or as a continuous process.

Various substances are known to be detrimental to the catalyst composition of this invention. These substances include carbon dioxide, oxygen and water. It is highly desirable, therefore, that the reactants and the diluent be freed of these materials as well as any other materials which tend to inactivate the catalyst. Any of the known methods for removing such contaminants can be used. In this connection it is desirable to remove air and moisture from the reaction vessel in which the polymerization is conducted. Although it is preferred to carry out the polymerization under anhydrous or substantially anhydrous conditions, it is to be understood that some small amounts of these catalyst-inactivating materials can be tolerated in the reaction mixture. However, it is also to be understood that the amount of such materials which may be tolerated in the reaction mixture is insufficient to cause complete deactivation of the catalyst.

At the completion of the polymerization reaction, the total reaction mixture is then treated to inactivate the catalyst and precipitate the product. Any suitable method can be utilized for carrying out this treatment of the reaction mixture. In one suitable method, the catalyst-inactivating agent, such as water or an alcohol, is added to the mixture so as to inactivate the catalyst and cause precipitation of the polymer. The polymer is then separated from the alcohol or water and diluent by any suitable means such as decantation or filtration. It is often preferred to add initially only an amount of the catalyst-inactivating agent which is sufficient to inactivate the catalyst without causing precipitation of the dissolved polymer. It has also been found to be advantageous to add an antioxidant, such as 2,6-di-t-butyl-4-methylphenol, to the polymer solution prior to precipitation of the polymer. After addition of the catalyst-inactivating agent and the antioxidant, the polymer present in the solution is then separated by the addition of an excess of an agent such as ethyl alcohol or isopropyl alcohol. When an alcohol is used as a catalyst-inactivating agent, it also functions to precipitate the polymer. In the event other catalyst-inactivating agents are employed, which do not perform this dual role, a suitable agent, such as an alcohol, is added to precipitate the polymer. It is, of course, to be realized that it is within the scope of the invention to employ other suitable means to recover the polymer from solution. After separation from the solvent mixture and alcohol by filtration or other suitable means, the polymer is dried.

The copolymers described above can be hydrogenated by various methods well known in the art. The hydrogenated copolymers of the present invention generally have an increased softening temperature as compared to the corresponding unhydrogenated copolymer. The increase in softening temperature is conveniently measured as the Vicat softening point.

Normally, at least about 65 percent of the olefinic unsaturation of the inventive copolymer is removed by hydrogenation in order to achieve a substantial increase in softening point; however, it is understood that copolymers with any portion of the olefinic unsaturation hydrogenated are within the scope of the invention. Also, in instances where the unhydrogenated copolymer contains styrene units, as previously discussed, removal of such aromatic unsaturation to any degree is within the scope of the copolymers of the present invention.

Although a number of hydrogenation processes are well known in the art which can be used in accordance with the present invention, and thus the present invention is not limited thereby, one such suitable process is described below.

An unsaturated copolymer as previously described and prepared in accordance with the invention is charged, in a condition substantially free of salts or other materials which might act as hydrogenation catalyst poisons, to a suitable hydrogenation reactor, said polymer being in the form of a solution or dispersion in a suitable solvent. In some instances the polymer dissolves completely, while in other instances a dispersion is formed. The solvent or dispersant is preferably inert to the hydrogenation reaction and to the other compounds present. Suitable solvents include saturated cyclic hydrocarbons such as cyclohexane, methylcyclohexane, decalin and the like. Aromatic hydrocarbons, such as benzene and toluene; cyclic ethers, such as dioxane; and paraffinic hydrocarbons such as isooctane, isoheptane, and normal heptane; hydroaromatic hydrocarbons such as tetralin; and the like, can also be used. Mixtures of solvents and/or dispersants can be employed if desired. The polymer concentration in the solvent or dispersant can vary over a relatively wide range, and can be as low as 1 weight percent although concentrations of about 5 to 25 weight percent are preferred.

In one embodiment, after the polymer has been dissolved in the solvent the hydrogenation catalyst is added, hydrogen is added, and the temperature raised to a suitable level for hydrogenation. This operation can be carried out in a batchwise or in a continuous manner.

One catalyst system which can be used employs two components, one being a reducing metal compound which can be represented by the formula $MR_n^{IV}$ wherein M represents a metal of Group I-A, II-A, or III-A of the Periodic System as shown on page B-2 of the "Handbook of Chemistry and Physics", 45th Edition, published by The Chemical Rubber Company in 1964, n is the valence of the metal M and each $R^{IV}$ is hydrogen or a hydrocarbyl radical having 1-20 carbon atoms such as alkyl, cycloalkyl, aryl or combinations thereof. Typical compounds representative of this component for the catalyst system include triisobutylaluminum, triethylaluminum, trieicosylaluminum, dicyclohexyl(phenyl)aluminum, 1-anthracenylpotassium, di-3-phenanthrylberyllium, n-butyllithium, dimethylmagnesium, di-n-propylbarium, tri-n-pentylgallium, diisobutylaluminum hydride, sodium hydride, aluminum hydride, and the like.

The second component of the catalyst system is a metal salt having the formula

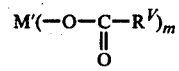

in which M' is a Group VIII metal of the above-referenced Periodic System; $R^V$ has the same meaning as for $R^{IV}$ in the formula for the first component; and m is the valence of M'. The second component is preferably a nickel salt. Typical compounds are nickel stearate, nickel acetate, nickel propionate, nickel formate, nickel octoate, nickel benzoate, nickel naphthenate, and the corresponding iron, cobalt, palladium, and platinum salts such as ferric stearate, cobalt naphthenate, cobalt octoate, and the like. Of this group nickel stearate, nickel octoate, and nickel naphthenate are the presently preferred compounds.

It is preferred to use the nickel salts of organic acids having 5-20 carbon atoms, preferably branched, because they are more readily soluble in the treating mixture. Lower molecular weight acid salts, however, such as nickel acetate can be used and one method of improving the physical form of such materials for use in the process is to grind the nickel acetate with mineral oil to form a very fine slurry prior to combining it with the reducing metal compound.

The hydrogenation catalysts are generally prepared by mixing the components in a solvent, for example, the hydrocarbon solvent to be used for the treating medium. Catalyst poisons such as oxygen, water or the like should be avoided. The ratio of the reducing metal component to the Group VIII metal compound varies widely. On a molar basis it is generally in the range of 0.1 to 10; however, good results are obtained employing a molar ratio in the range of about 0.5 to 5 moles per mole. The concentration of the catalyst in the reaction mixture can also vary widely; it is generally in the range of 0.001 to 10 weight percent based on the polymer; however, good results are obtained employing a concentration in the range of 0.002 to 5 weight percent. Greater or lesser amounts of catalyst can, however, be used.

To hydrogenate at least a portion of the olefinic unsaturation, the polymer, generally in solution, is contacted with the hydrogenation catalyst under conditions which include temperatures in the range of about 10° to about 250° C. and pressures up to about 1000 psig. The reaction time can vary from 1 minute to about 25 hours or more. Good results are obtained employing temperatures in the range of about 75° to about 200° C., pressures in the range of about 10 to about 500 psig and reaction times in the range of about 10 minutes to about 10 hours. When treating the polymer in solution the pressure is usually that sufficient to maintain reaction mixture substantially in the liquid phase.

To hydrogenate at least a portion of the aromatic unsaturation in addition to the olefinic unsaturation in instances where the polymer is made from styrene or derivatives thereof, the polymer, generally in solution, is contacted with the catalyst under conditions which include temperatures in the range of from about 10° to about 250° C., pressures up to about 3000 psig and reaction times in the range of from about 10 minutes to about 40 hours or more. Good results are obtained employing conditions which include temperatures in the range of from about 75° to about 200° C., pressures in the range of from about 100 to about 1500 psig, and reaction times in the range of from about 1 hour to about 20 hours.

In accordance with the invention, hydrogenated copolymers have been produced with essentially all the olefinic unsaturation hydrogenated and as much as 80 percent of the aromatic unsaturation hydrogenated. Such hydrogenated copolymers show a substantial increase in their Vicat temperatures as compared to the unhydrogenated copolymers. Further, these hydrogenated copolymers have well-developed resinous characteristics.

Upon the effective completion of the hydrogenation reaction, the hydrogenated polymer can be isolated by simple, well-known techniques. For example, the catalyst components can be converted to water-soluble salts and washed from the polymer solution. The polymer solution can then be dried, and an antioxidant added if desired, and the polymer isolated by evaporation of the solvent.

The copolymers produced in accordance with the process of the invention are thermoplastic and can be used for fabricating articles such as combs, toys, kitchen utensils, refrigerator parts, automobile parts and various other industrial and commercial items. In addition, the high clarity of the polymers in molded form makes possible the production of transparent containers and their use in optical applications. Also these copolymers containing a high 1,3-cyclodiene content possess softening points such that containers and other objects molded from such copolymers possess sufficient high temperature stability to permit hot water sterilization practice. The hydrogenated copolymers of the invention can be fabricated into clear plastic articles which will have a high softening temperature. Those copolymers with the aromatic unsaturation hydrogenated can be subjected to service temperatures which are unusually high for plastic articles. In addition the hydrogenated and unhydrogenated copolymers can be compounded with stabilizers, antioxidants, fillers, pigments, reinforcing agents and other such additives as may be required.

ILLUSTRATIVE EXAMPLES

In the following examples the polymerizations were carried out under nitrogen in capped beverage bottles employing anhydrous reactants and conditions. The bottles were tumbled in a constant temperature bath for the stipulated polymerization times and at the stipulated temperatures. Following polymerization, 2,6-di-t-butyl-4-methylphenol (1 part by weight per hundred of monomers) was added in a 50/50 volume toluene/isopropyl alcohol solution, the polymer solutions were filtered, and the polymers were coagulated by adding the filtrates to isopropyl alcohol. The polymers were then collected by filtration and dried under reduced pressure. All of the polymers were resinous in character.

Abbreviations used in the examples below are as follows:
THF — tetrahydrofuran
Sty — styrene
CHD — 1,3-cyclohexadiene
DiLi-3 — Difunctional Lithium Catalyst, principally 1,3-bis(1-lithio-3-methylpentyl)benzene, as described above.

IV — inherent viscosity
phm — parts by weight per hundred parts by weight monomers
mhm — gram millimoles per 100 grams monomers Also inherent viscosity and gel content were determined in accordance with Notes (a) and (b) respectively in U.S. Pat. No. 3,278,508, column 20, with the exception that tetrahydrofuran was used as the reference liquid rather than toluene and, with regard to inherent viscosity, the solution was not filtered through a sulfur absorption tube but rather a sample of the solution was filtered through a fritted glass filter stick of grade C porosity and pressured directly into the viscometer. The weight percent 1,3-cyclohexadiene represented in the copolymer was determined by chemical determination of carbon-carbon unsaturation. Flexural Modulus was determined in accordance with ASTM D 790-63. Tensile Strength and Percent Elongation values were determined in accordance with ASTM D 412-66 and the Vicat Softening Point in °F. was determined in accordance with ASTM D 1525-58T. A dash (-) indicates a particular value was not determined. In the tables below, weight percent conversion represents the percentage of the reaction mixture which was converted to the copolymer and excludes any homopolymer that may have been produced.

EXAMPLE I

Two runs were made according to a recipe as follows:

| Recipe | | |
|---|---|---|
| Charge Order | | phm |
| 2 | Styrene | 50 |
| 3 | 1,3-Cyclohexadiene | 50 |
| 1 | Cyclohexane | 780 |
| 5 | DiLi-3 | 6 milliequivalents |
| 4 | Tetrahydrofuran | variable |
| | Temperature, ° F | 122 |
| | Time, hrs. | 16 |

TABLE I

| Run No. | THF phm | Conversion Wt. % | I.V. | Gel Wt. % | Styrene in Polymer Wt. % |
|---|---|---|---|---|---|
| 1 | 0 | 60 | 0.27 | 0 | 63 |
| 2 | 5 | 83[a] | 0.47 | 0 | 56 |

[a]Polymer was pressed at 308° F into a crystal clear sheet.

The run carried out in the presence of THF, run 2 as shown in Table I, resulted in a higher conversion level than the run carried out in the absence of tetrahydrofuran and the inherent viscosity data indicated the presence of tetrahydrofuran resulted in a higher molecular weight polymer.

EXAMPLE II

Four additional runs were made in accordance with the following recipe:

| Recipe | | |
|---|---|---|
| Charge Order | | phm |
| 2 | Styrene | variable |
| 2 | 1,3-Cyclohexadiene | variable |
| 1 | Cyclohexane | 700 |
| 4 | Tetrahydrofuran | 5 |
| 5 | DiLi-3 | 3.2 milliequivalents |
| | Temperature, ° F | 122 |

-continued

| Charge Order | Recipe | phm |
|---|---|---|
| | Time, hrs. | 16 |

TABLE II

| Run No. | Styrene phm | CHD phm | Conversion Wt. % | Styrene in Polymer Wt. % | Flex. Mod. psi $\times 10^{-3}$ | Tensile psi | Elongation % | Vicat °F |
|---|---|---|---|---|---|---|---|---|
| 3[a] | 50 | 50 | 60 | 86 | — | — | — | — |
| 4 | 50 | 50 | 75 | 65 | 369 | 6110 | 6 | 242 |
| 5 | 70 | 30 | 95 | 56 | 383 | 6070 | 6 | 220 |
| 6 | 30 | 70 | 55 | 57 | 344 | 6110 | 6 | 250 |

[a]Physical property determinations were not made because available data indicated the results of the run were anomalous.

In the runs of Table II above the conversion of the reactants to the desired polymer and the flexural modulus of this polymer increased as the 1,3-cyclohexadiene content in the feed decreased. The Vicat softening temperature increased with increasing 1,3-cyclohexadiene content and the absolute values of the temperatures demonstrate the feasibility of hot water sterilization of objects molded from the high 1,3-cyclohexadiene content copolymers.

EXAMPLE III

Further runs were made in accordance with the following recipe:

| Charge Order | Recipe | phm |
|---|---|---|
| 1 | Solvent | |
| | Cyclohexane | 780 |
| | or | |
| | Toluene | 860 |
| 2 | Styrene | variable |
| 3 | 1,3-Cyclohexadiene | variable |
| 4 | Tetrahydrofuran | 2 |
| 5 | n-Butyllithium | variable |
| | Temperature | variable |
| | Time, hrs. | 16 |

TABLE III

| | | Conversion, Wt, % | | |
|---|---|---|---|---|
| Run No. | Weight Fraction Sty/CHD | Cyclohexane THF BuLi, 0.4 mhm 122° F | Cyclohexane THF BuLi, 0.8 mhm 41° F | Toluene THF BuLi, 0.8 mhm 41° F |
| 7a | 100/0 | 100 | — | — |
| 7b | 100/0 | — | 100 | — |
| 7c | 100/0 | — | — | 100 |
| 8a | 90/10 | 99 | — | — |
| 8b | 90/10 | — | 100 | — |
| 8c | 90/10 | — | — | 99 |
| 9a | 80/20 | 89 | — | — |
| 9b | 80/20 | — | 100 | — |
| 9c | 80/20 | — | — | 90 |
| 10a | 70/30 | 65 | — | — |
| 10b | 70/30 | — | 95 | — |
| 10c | 70/30 | — | — | 34 |
| 11a | 60/40 | 48 | — | — |
| 11b | 60/40 | — | 84 | — |
| 11c | 60/40 | — | — | 49 |
| 12a | 50/50 | 22 | — | — |
| 12b | 50/50 | — | 86 | — |
| 12c | 50/50 | — | — | 9 |
| 13a | 0/100 | 27 | — | — |
| 13b | 0/100 | — | 76 | — |
| 13c | 0/100 | — | — | trace |

In the runs of Table III above styrene polymerized more readily than 1,3-cyclohexadiene. Also the cyclohexane-tetrahydrofuran system was superior to the toluene-tetrahydrofuran system. The operability of the invention is demonstrated throughout the entire range of monomer ratios.

EXAMPLE IV

Additional runs were made in accordance with the following recipe:

| Charge Order | Recipe | phm |
|---|---|---|
| 1 | Solvent | |
| | Cyclohexane | 585 |
| | or | |
| | Toluene | 645 |
| 3 | 1,3-Cyclohexadiene | 50 |
| 2 | Styrene | 50 |
| 4 | Tetrahydrofuran | variable |
| 5 | sec-Butyllithium | 2.4 mhm |
| | Temperature | variable |
| | Time, hrs.[a] | 6 at 77 and 122° F |
| | | 72 at 41° F |

[a]Runs were continued to the point where polymerization ceased.

TABLE IV

| Run No. | Solvent | THF phm | Temp. °F | Wt. % Conversion |
|---|---|---|---|---|
| 14 | Cyclohexane | 0 | 41 | 23 |
| 15 | Cyclohexane | 0 | 77 | 21 |
| 16 | Cyclohexane | 0 | 122 | 19 |
| 17 | Cyclohexane | 1 | 41 | 76 |
| 18 | Cyclohexane | 1 | 77 | 65 |
| 19 | Cyclohexane | 1 | 122 | 52 |
| 20 | Cyclohexane | 2 | 41 | 78 |
| 21 | Cyclohexane | 2 | 77 | 69 |
| 22 | Cyclohexane | 2 | 122 | 59 |
| 23 | Toluene | 0 | 41 | 8 |
| 24 | Toluene | 0 | 77 | 6 |
| 25 | Toluene | 0 | 122 | 10 |
| 26 | Toluene | 2 | 41 | 49 |
| 27 | Toluene | 2 | 77 | 45 |
| 28 | Toluene | 2 | 122 | 44 |

In the runs of Table IV conversion was favored by lower reaction temperatures and the presence of tetrahydrofuran promoted higher degrees of conversion. In addition, cyclohexane was again shown to be a diluent superior to toluene whether or not tetrahydrofuran was present.

EXAMPLE V

Further runs were made in accordance with the following recipe:

| Charge Order | Recipe | phm |
|---|---|---|
| 1 | Cyclohexane | 585 |
| 3 | 1,3-Cyclohexadiene | 50 |
| 2 | Styrene | 50 |
| 4 | Tetrahydrofuran | variable |
| 5 | sec-Butyllithium | 2.4 mhm |
| | Temperature | variable |

-continued

| Recipe | |
|---|---|
| Charge Order | phm |
| Time, hrs. | 16 |

TABLE V

| Run No. | Temp., °F | THF, phm | % Conversion | IV | Gel Wt. % |
|---|---|---|---|---|---|
| 29 | 41 | 0 | 23 | — | — |
| 30 | 41 | 1 | 76 | 0.49 | 0 |
| 31 | 41 | 2 | 78 | 0.46 | 0 |
| 32 | 41 | 4 | 67 | 0.51 | 0 |
| 33 | 41 | 6 | 72 | 0.46 | 0 |
| 34 | 41 | 10 | 67 | 0.44 | 0 |
| 35 | 77 | 0 | 21 | — | — |
| 36 | 77 | 1 | 65 | 0.48 | 0 |
| 37 | 77 | 2 | 69 | 0.48 | 0 |
| 38 | 77 | 4 | 65 | 0.45 | 0 |
| 39 | 77 | 6 | 65 | 0.43 | 0 |
| 40 | 77 | 10 | 61 | 0.41 | 0 |

The data shown in Table V above again illustrates that lower temperatures favor higher conversion. Also the above data generally indicate that conversion can be increased by adding tetrahydrofuran to the reaction mixture, and that the effect of the added tetrahydrofuran increases up to a point beyond which continued increases cause the conversion to decline.

EXAMPLE VI

Further runs were made in accordance with the following recipe:

| Recipe | | |
|---|---|---|
| | phm | mhm |
| Cyclohexane | 780 | |
| Styrene | variable | |
| 1,3-Cyclohexadiene | variable | |
| Tetrahydrofuran | variable | |
| sec-Butyllithium, or | | 3 |
| n-Butyllithium | | 3 |
| Time | variable (periodic sampling) | |
| Temperature | variable | |

TABLE VI

| Run No. | Sty phm | CHD phm | THF phm | BuLi-isomer | Time min. | Temp. °F | Conversion Wt. % | CHD % |
|---|---|---|---|---|---|---|---|---|
| 41 | 60 | 40 | 0 | sec- | 7 | 122 | 46.5 | 31.9 |
| 42 | 60 | 40 | 0 | sec- | 15 | 122 | 51.9 | 32.5 |
| 43 | 60 | 40 | 0 | sec- | 30 | 122 | 52.4 | — |
| 44 | 60 | 40 | 0 | sec- | 45 | 122 | 53.5 | — |
| 45 | 60 | 40 | 0 | sec- | 60 | 122 | 53.2 | — |
| 46 | 60 | 40 | 0 | sec- | 210 | 122 | 55.4 | 32.8 |
| 47 | 60 | 40 | 2 | n- | 1.5 | 86 | 17.4 | 3.9 |
| 48 | 60 | 40 | 2 | n- | 3 | 86 | 40.3 | 7.0 |
| 49 | 60 | 40 | 2 | n- | 10 | 86 | 68.8 | 12.1 |
| 50 | 60 | 40 | 2 | n- | 20 | 86 | 78.3 | 18.8 |
| 51 | 60 | 40 | 2 | n- | 45 | 86 | 88.9 | 21.9 |
| 52 | 60 | 40 | 5 | n- | 1.25 | 86 | 15.4 | — |
| 53 | 60 | 40 | 5 | n- | 3 | 86 | 34.7 | 4.3 |
| 54 | 60 | 40 | 5 | n- | 10 | 86 | 63.6 | 7.1 |
| 55 | 60 | 40 | 5 | n- | 22.5 | 86 | 76.7 | 18.2 |
| 56 | 60 | 40 | 5 | n- | 45 | 86 | 86.9 | 21.3 |

From the above data shown in Table VI it was determined that the presence of tetrahydrofuran markedly raised the polymerization rate, promoted 1,3-cyclohexadiene blockiness by concentrating the incorporation of 1,3-cyclohexadiene into the latter stages of polymerization and permitted the use of the more economical normal isomer of the organolithium initiator in place of the secondary isomer by raising the reactivity of the normal isomer. It is noted that the reaction temperature was lower when the tetrahydrofuran/-n-butyllithium initiator was used and the increase in polymerization rate and high reactivity of the normal organolithium isomer can be attributed, to some degree, to the lower reaction temperature; however, from the previous examples, in particular Examples IV and V, it can be seen that the lower reaction temperature alone will not produce the degree of improvement in the conversion indicated above.

EXAMPLE VII

Further runs were made in accordance with the following recipe:

| Recipe | |
|---|---|
| Solvent | phm |
| 2,3-dimethylbutane[(1)] | 500 |
| methylcyclopentane[(1)] | 565 |
| cyclohexane | 585 |
| 1,3-Cyclohexadiene | 50 |
| Styrene | 50 |
| Tetrahydrofuran | variable |
| sec-Butyllithium | 4.8 mhm |
| Temperature | 50° C |
| Time, hrs. | 5 |

[(1)]Distilled from n-butyllithium.

TABLE VII

| Run No. | Solvent | Tetrahydrofuran phm | Conversion Wt. % | Inherent Viscosity | Gel Wt. % |
|---|---|---|---|---|---|
| 57 | 2,3-dimethylbutane | 0 | 29 | 0.3 | 0 |
| 58 | 2,3-dimethyl butane | 2 | 45.5 | 0.63 | 0 |
| 59 | methylcyclopentane | 0 | 29 | 0.22 | 0 |
| 60 | methylcyclopentane | 2 | 35.5 | 0.52 | 0 |
| 61 | cyclohexane | 0 | 33 | 0.22 | 0 |

Comparing data shown in Table VII with that in Table IV, it is clear that 2,3-dimethylbutane, methylcyclopentane and cyclohexane are superior diluents compared to toluene where no ether is present.

EXAMPLE VIII

A series of runs was made in accordance with the following recipe. These runs measured the comparative effectiveness of several agents useful for employment with the organolithium initiator in order to increase the degree of conversion and the polymerization rate. It is noted that two of these compounds are ethers and two are tertiary amines.

| Recipe | |
|---|---|
| | phm |
| Cyclohexane | 780 |
| Styrene | 60 |
| 1,3-Cyclohexadiene | 40 |
| DiLi-3 | 7.0 milliequivalents |
| N,N,N',N'-Tetramethylethylenediamine (TMED) | variable |
| Dimethoxyethane (DME) | variable |
| Tetrahydrofuran (THF) | variable |
| Triethylamine (TEA) | variable |
| Temperature | 30° C (86° F) |
| Time, hours | 16 |

The charge information and results appear in the following table.

TABLE VIII

| Run No. | Agent Compound | phm | Conversion Weight % |
|---|---|---|---|
| 62 | None | 0 | 45.5 |
| 63 | TMED | 0.2 | 87.5 |
| 64 | TMED | 0.5 | 93.0 |
| 65 | TMED | 2.0 | 88.5 |
| 66 | DME | 0.5 | 82.5 |
| 67 | DME | 2.0 | 80.5 |
| 68 | THF | 2.0 | 96.5 |
| 69 | THF | 4.0 | 96.5 |
| 70 | TEA | 2.0 | 53.0 |
| 71 | TEA | 5.0 | 58.0 |

In a comparison between the conversion of run 62 in which no ether or tertiary amine was used and the conversion for runs 63 through 71 in which either an ether or tertiary amine was used, it is clear that both ethers and tertiary amines improve conversion under the conditions employed.

EXAMPLE IX

As a further example, run 72 was made employing a slightly lower temperature and higher ratio of 1,3-cyclohexadiene to styrene than in Example VI. The following recipe was used:

| Recipe | phm | mhm |
|---|---|---|
| Cyclohexane | 585 | |
| 1,3-Cyclohexadiene | 50 | |
| Styrene | 50 | |
| Tetrahydrofuran | 2 | |
| sec-Butyllithium | | 4 |
| Time, hrs. | 16 | |
| Temperature, °F | 77 | |

The resulting polymer, which was obtained with 100% conversion of monomer, possessed the following properties:
Inherent viscosity: 0.37
Gel, wt. %: 0.00

Examination of the polymer by nuclear magnetic resonance spectroscopy indicated that this 1,3-cyclohexadiene-rich polymer possessed a very high degree of blockiness with most of the styrene units present in block form. This information coupled with the time-vs-1,3-cyclohexadiene incorporation data of Example VI indicated a styrene-styrene/1,3-cyclohexadiene-1,3-cyclohexadiene block structure.

EXAMPLE X

Further runs were made employing the recipe tabulated below.

TABLE IX

| Run No. | Sty/CHD | Initiator Compound | meh | THF phm | Hrs | °C | Conversion wt % | IV | Gel wt % | Vicat °C | Tensile Break psi |
|---|---|---|---|---|---|---|---|---|---|---|---|
| 73 | 60/40 | sec-BuLi | 3.4 | 2.0 | 5.5 | 30 | 96 | 0.39 | 0 | 115 | 1760 |
| 74 | 60/40 | DiLi-3 | 5.6 | 2.0 | 16 | 30 | 94.1 | 0.71 | 0 | 114 | 4670 |
| 75 | 60/40 | DiLi-3 | 5.6 | 5.0 | 16 | 30 | 94.2 | 0.65 | 0 | 116 | 4000 |
| 76 | 60/40 | DiLi-3 | 5.6 | 0.8 | 16 | 30 | 87.1 | 0.72 | —(a) | 110 | 4810 |

(a)not determined

As seen from Table IX, the copolymers of runs 74–76 produced employing an organolithium initiator having a lithium functionality greater than one possessed more than twice the tensile strength of the copolymer of run 73 produced with a monofunctional initiator.

EXAMPLE XI

Additional runs were carried out to illustrate the hydrogenated copolymers of the invention. The following recipe was used for the polymerizations:

| Recipe | phm | meqhm[1] |
|---|---|---|
| Cyclohexane | 546 | |
| Styrene | 60 | |
| 1,3,-Cyclohexadiene | 40 | |
| Tetrahydrofuran | 0.8 | |
| DiLi-3 | | variable |
| Temperature, °C | | 30 |
| Time, hrs. | | 16 |

| Run No. | DiLi-3 meqhm | Conversion wt. % |
|---|---|---|
| 77 | 5.6 | 87.1 |
| 78 | 6.4 | 92.0 |
| 79 | 7.2 | 93.2 |
| 80 | 8.0 | 94.5 |
| 81 | 8.0 | 94.6 |

[1]Gram milliequivalents per hundred grams of monomer
Note: In Run 81, 2.0 phm of tetrahydrofuran was used.

One-half of the copolymer of each run above was then dissolved in toluene and hydrogenated to remove a substantial portion of the olefinic unsaturation employing 5.0 mhm of nickel, charged as 5 mhm nickel octoate in the presence of 10 mhm triethylaluminum, employing for hydrogenation a hydrogen pressure of 50 psi for approximately 3 hrs. at 70° C. Hydrogenation effectively terminated during this period. The polymer solutions after hydrogenation were mixed with water to destroy triethylaluminum and were aerated to oxidize the nickel. They were treated with a mixture of phosphoric acid and ammonium hydrogen phosphate to form the respective metal phosphates. In each case the organic phase was mixed with isopropyl alcohol to coagulate the polymer. The polymer was separated by filtration and solvent traces removed at 100° C. under reduced pressure. Tris(nonylphenyl)phosphite, 1.5 parts, and 2,6-di-t-butyl-4-methylphenol, 0.5 parts, were mixed into the polymer at 150° C. on a roll mill. Properties determined for the hydrogenated polymer fractions are tabulated below with those of the corresponding unhydrogenated polymer fractions. The hydrogenated polymer fractions are indicated by the letter "H" beside the run number in Table X below.

TABLE X

| Polymer Fraction | IV | 10x Melt Flow[1] | Flexural Modulus psig×10⁻³[2] | Tensile psig[3] | Elongation %[3] | Vicat Temp. °C[4] |
|---|---|---|---|---|---|---|
| 77 | 0.72 | 5.37 | 389 | 4810 | 3 | 110 |
| 77H | 0.72 | 1.43 | 380 | 6320 | 4 | 116 |
| 78 | 0.65 | 3.81 | 378 | 5590 | 4 | 112 |
| 78H | 0.83 | 0.41 | 378 | 4960 | 3 | 124 |
| 79 | 0.64 | 4.42 | 375 | 5590 | 4 | 114 |
| 79H | 0.80 | 0.44 | 377 | 4230 | 3 | 129 |
| 80 | 0.60 | 2.95 | 392 | 5980 | 5 | 113 |
| 80H | 0.73 | 0.23 | 391 | 4140 | 3 | 129 |
| 81 | 0.54 | 2.55 | 375 | 5950 | 4 | 112 |

TABLE X-continued

| Polymer Fraction | IV | 10x Melt Flow[1] | Flexural Modulus psig×10$^{-3}$[2] | Tensile psig[3] | Elongation %[3] | Vicat Temp. °C[4] |
|---|---|---|---|---|---|---|
| 81H | 0.49 | 0.04 | 404 | 3390 | 2 | 126 |

[1]Melt flow: g./10 min. at 200° C/21.6 Kg weight determined in accordance with ASTM D1238.
[2]ASTM D 790-630
[3]Tensile strength and percent elongation were determined inaccordance with ASTM D 412-66.
[4]ASTM D 1525-58T.

In all instances the Vicat softening point temperature values for the hydrogenated copolymer were appreciably higher as compared to the values for the unhydrogenated copolymer. All copolymers were resinous.

EXAMPLE XII

A cyclohexadiene/styrene copolymer was synthesized in accordance with the following recipe and subsequently intensively hydrogenated. The recipe components are listed in the order charged. The polymerization was carried out following the general procedure employed in the other polymerizations of this case.

| Recipe | phm | meqhm |
|---|---|---|
| Cyclohexane | 546 | |
| Styrene | 60 | |
| 1,3-Cyclohexadiene | 40 | |
| Tetrahydrofuran | 1.2 | |
| DiLi-3 | | 7.2 |
| Temperature, ° C | | 30 |
| Time, hrs. | | 7 |

The polymer cement produced from the above recipe was dissolved in additional cyclohexane. Methanol was added to terminate the living polymer and the polymer was redissolved by tumbling at 50° C. A mixture of triethylaluminum and nickel octoate in a 2Al/Ni atom ratio and affording 15 mhm nickel was added in cyclohexane. Hydrogenation of this mixture was carried out in a stirred reactor at 72°-155° C. and 170-900 psig hydrogen for 7.75 hours. The resinous, hydrogenated polymer was recovered by the procedure described previously for olefinic hydrogenations. The conversion from monomer to hydrogenated polymer was 86.4 wt. %. The residual or unhydrogenated styrene content, determined by ultraviolet absorption spectroscopy, was 18%.

| Polymer Properties | |
|---|---|
| 10 × Melt flow (g./10 min. at 200° C/21.6 kg weight) | 0.07 |
| Flexural modlus, psig × 10$^{-3}$ | 268 |
| Tensile break, psi | 5800 |
| Elongation, % | 8 |
| Vicat Temperature, ° C | 145 |

A comparison of the Vicat temperature of the above polymer with the Vicat values for similar hydrogenated and unhydrogenated copolymers of Runs 79 (114 and 129) and 81 (112 and 126) discloses that the above copolymer, which was subjected to intensive hydrogenation to remove a substantial portion of the aromatic unsaturation, possesses a significantly higher Vicat temperature.

What is claimed is:

1. A method for the production of a 1,3-cyclodiene/-vinylaromatic copolymer which comprises polymerizing a 1,3-cyclodiene comonomer and a vinylaromatic hydrocarbon comonomer in a reaction mixture comprising the 1,3-cyclodiene comonomer represented by the formula

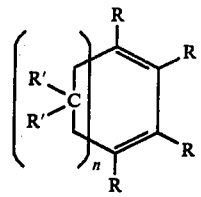

wherein n is 1 or 2, R is selected from the group consisting of a hydrogen, methyl or ethyl radical and R' is selected from the group consisting of a hydrogen, alkyl, cycloalkyl, and aryl radical with a maximum of 6 carbon atoms per R' group;
the vinylaromatic hydrocarbon comonomer of from about 8 to 14 carbon atoms per molecule;
a diluent, wherein the diluent is selected from the group consisting of linear and branched paraffin and cycloparaffin hydrocarbons of 4 to 12 carbon atoms per molecule and wherein the diluent is present in an amount sufficient to produce an increase in conversion as compared to the conversion produced when toluene is used as the diluent;
an organolithium initiator; and
optionally an ether or a tetiary amine.

2. A method for the production of a 1,3-cyclodiene/-vinylaromatic copolymer which comprises polymerizing a 1,3-cyclodiene comonomer and a vinylaromatic hydrocarbon comonomer in a reaction mixture consisting essentially of the 1,3-cyclodiene comonomer represented by the formula

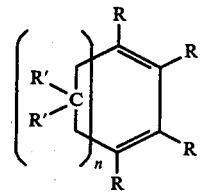

wherein n is 1 or 2, R is selected from the group consisting of a hydrogen, methyl or ethyl radical and R' is selected from the group consisting of a hydrogen, alkyl, cycloalkyl, and aryl radical with a maximum of 6 carbon atoms per R'0 group;
the vinylaromatic hydrocarbon comonomer of from about 8 to 14 carbon atoms per molecule;
a diluent selected from the group consisting of 2,3-dimethylbutane, n-heptane, methylcyclopentane, 2,2,4-trimethylpentane and cyclohexane;
an organolithium initiator represented by the formula R"Li$_x$ wherein R" is selected from the group consisting of an aliphatic, alicyclic and aromatic radical of from 1 to 20 carbon atoms per radical, x is an integer of from 1 to 4 and the valence of R" is equal to x; or
an organolithium initiator represented by the formula

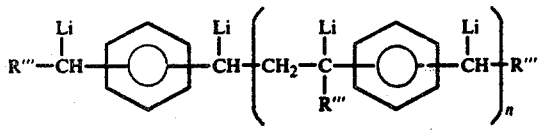

wherein R''' is a linear or branched alkyl containing 2 to 12 carbon atoms, and n is an integer from 0 to 2; and optionally an ether or a tertiary amine.

3. The method of claim 2 wherein the ratio by weight of vinylaromatic compound to 1,3-cyclodiene is in the range of from about 99:1 to 1:99.

4. The method of claim 3 wherein the ratio by weight of vinylaromatic compound to 1,3-cyclodiene is in the range of from about 95:5 to 25:75.

5. The method of claim 4 wherein the amount of said ether or said tertinary amine is in the range of from about 0.01 to 50 phm and said polymerization is carried out at a temperature in the range of from about 0 to 300° F.

6. The method of claim 5 wherein said ether is tetrahydrofuran or the tertiary amine is N,N,N',N'-tetramethylethylenediamine in the range of from about 0.1 to 10 phm and said polymerization is carried out at a temperature in the range of from about 30 to 150° F.

7. The method of claim 2 wherein said polymerization is carried out at autogenous pressure.

8. The method of claim 2 wherein said polymerization is carried out at a pressure sufficient to maintain a reaction mixture substantially in a liquid state.

9. The method of claim 6 wherein 1,3-cyclohexadiene and styrene are polymerized in the presence of n-butyllithium or primarily 1,3-bis(1-lithio-3-methylpentyl)benzene.

10. The method of claim 9 wherein the copolymer produced is a block copolymer of the form styrene-styrene/1,3-cyclohexadiene-1,3-cyclohexadiene.

11. A method for producing a 1,3-cyclodiene/vinylaromatic copolymer comprising polymerizing a polymerization mixture consisting essentially of a 1,3-cyclodiene represented by the formula

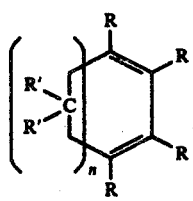

wherein n is 1 or 2, R is selected from the group consisting of a hydrogen, methyl or ethyl radical and R' is selected from the group consisting of a hydrogen, alkyl, cycloalkyl, and aryl radical with a maximum of 6 carbon atoms per R' group;
 a vinylaromatic hydrocarbon of from about 8 to 14 carbon atoms per molecule;
 optionally an ether or a tertiary amine;
 optionally a diluent; and
 an organolithium initiator wherein said organolithium initiator has a lithium functionality greater than 1, said copolymer having improved tensile strength as compared to such copolymers produced employing organolithium initiators having a lithium functionality equal to 1.

12. The method of claim 11 wherein the organolithium initiator is represented by the formula $R''Li_x$ wherein R'' is selected from the group consisting of an aliphatic, alicyclic and aromatic radicals of from 1 to 20 carbon atoms per radical, x is an integer of from 2 to 4 and the valence of R is equal to x; or
 wherein the organolithium initiator is represented by the formula

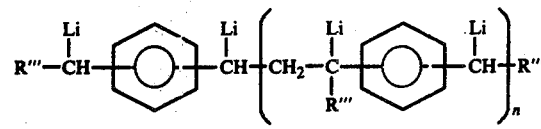

wherein R''' is a linear or branched alkyl containing 2 to 12 carbon atoms, and n is an integer from 0 to 2.

13. The method of claim 11 wherein the ratio by weight of vinylaromatic compound to 1,3-cyclodiene is in the range of from about 99:1 to 1:99.

14. The method of claim 11 wherein the ratio by weight of vinylaromatic compound to 1,3-cyclodiene is in the range of from about 95:5 to 25:75.

15. The method of claim 11 wherein the ether or the tertiary amine is in an amount ranging from about 0.01 to 50 phm and said polymerization is carried out at a temperature in the range of from about 0 to 300° F.

16. The method of claim 15 wherein said ether is tetrahydrofuran or the tertiary amine is N,N,N',N'-tetramethylethylenediamine and the amount of said ether or tertiary amine is in the range of from about 0.1 to 10 phm and said polymerization is carried out at a temperature in the range of from about 30 to 150° F.

17. The method of claim 11 wherein 1,3-cyclohexadiene and styrene are polymerized in the presence of 1,3-bis(1-lithio-3-methylpentyl)benzene.

18. The method of claim 11 wherein the diluent is selected from the group consisting of linear and branched paraffin and cycloparaffin hydrocarbons of 4 to 12 carbon atoms per molecule.

19. The method of claim 18 wherein said diluent is selected from the group consisting of 2,3-dimethylbutane, n-heptane, methylcyclopentane, 2,2,4-trimethylpentane and cyclohexane.

20. The method of claim 11 further comprising passing the copolymers produced by said polymerization to a hydrogenation zone wherein a portion of the olefinic unsaturation of said copolymer is hydrogenated in the presence of a hydrogenation catalyst.

21. The method of claim 20 wherein at least 65 percent of the olefinic unsaturation of said copolymer is hydrogenated.

22. The method of claim 20 wherein essentially all of the olefinic unsaturation is hydrogenated and at least a portion of the aromatic unsaturation is hydrogenated.

23. The method of claim 20 wherein at least 80 percent of the aromatic unsaturation is hydrogenated.

24. A 1,3-cyclodiene/vinylaromatic copolymer produced by polymerizing a reaction mixture consisting essentially of
 a 1,3-cyclodiene represented by the general formula

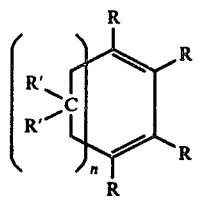

wherein n is 1 or 2, R is selected from the group consisting of a hydrogen, methyl or ethyl radical and R' is selected from the group consisting of a hydrogen, alkyl, cycloalkyl, and aryl radical with a maximum of 6 carbon atoms per R' group;
  a vinylaromatic hydrocarbon of from about 8 to 14 carbon atoms per molecule;
  a polymerization initiator wherein the ratio by weight of vinylaromatic hydrocarbon in the polymerization mixture to 1,3-cyclodiene ranges from about 99:1 to 1:99; and
  optionally an ether or a tertiary amine in an amount in the range of from about 0.01 to 50 phm;
  optionally a polymerization diluent selected from the group consisting of linear and branched paraffin and cycloparaffin hydrocarbons of 4 to 12 carbon atoms per molecule;
  wherein said polymerization initiator consists essentially of an organolithium initiator having a lithium functionality greater than 1, and said copolymer has improved tensile strength as compared to such copolymers produced employing organolithium initiators having a lithium functionality equal to 1.

25. The copolymer of claim 24 wherein a portion of the olefinic unsaturation is hydrogenated.

26. The copolymer of claim 24 wherein at least 65 percent of the olefinic unsaturation is hydrogenated.

27. The copolymer of claim 24 wherein essentially all of the olefinic unsaturation is hydrogenated and at least a portion of the aromatic unsaturation is hydrogenated.

28. The copolymer of claim 24 wherein at least 80 percent of the aromatic unsaturation is hydrogenated.

29. The copolymer of claim 24 wherein the 1,3-cyclodiene is 1,3-cyclopentadiene or 1,3-cyclohexadiene, the vinylaromatic hydrocarbon is styrene, the polymerization is carried out in presence of an ether or tertiary amine and a diluent selected from the group consisting of linear and branched paraffin and cycloparaffin hydrocarbons of 4 to 12 carbon atoms per molecule.

30. The copolymer of claim 24 wherein the polymerization mixture comprises a ratio by weight of vinylaromatic compound to 1,3-cyclodiene in the range of from about 99:1 to 1:99, and polymerization is carried out with the amount of initiator ranging from about 0.1 to about 100 millimoles per 100 grams of total monomers.

31. The copolymer of claim 30 wherein the polymerization temperature ranges from about 0 to about 300° F. and the polymerization pressure is sufficient to maintain the reaction mixture substantially in a liquid state.

32. A method for the production of a 1,3-cyclodiene/vinylaromatic copolymer which comprises polymerizing a 1,3-cyclodiene comonomer and a vinylaromatic hydrocarbon comonomer in a reaction mixture comprising the 1,3-cyclodiene comonomer represented by the formula

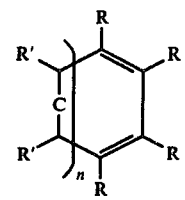

wherein n is 1 or 2, R is selected from the group consisting of a hydrogen, methyl or ethyl radical and R' is selected from the group consisting of a hydrogen, alkyl, cycloalkyl, and aryl radical with a maximum of 6 carbon atoms per R' group;
  the vinylaromatic hydrocarbon comonomer of from about 8 to 14 carbon atoms per molecule;
  a diluent, wherein the diluent is selected from the group consisting of linear and branched paraffin and cycloparaffin hydrocarbons of 4 to 12 carbon atoms per molecule and wherein the amount of diluent employed is at least 500 parts per hundred parts monomers;
  an organolithium initiator; and
  optionally an ether or a tertiary amine.

33. The method of claim 32 wherein the diluent is selected from the group consisting of 2,3-dimethylbutane, n-heptane, methylcyclopentane, 2,3,4-trimethylpentane and cyclohexane.

34. A method for the production of a 1,3-cyclodiene/vinylaromatic copolymer which comprises polymerizing a reaction mixture consisting of a 1,3-cyclodiene represented by the formula

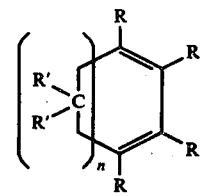

wherein n is 1 or 2, R is selected from the group consisting of a hydrogen, methyl or ethyl radical and R' is selected from the group consisting of a hydrogen, alkyl, cycloalkyl, and aryl radical with a maximum of 6 carbon atoms per R' group;
  a vinylaromatic hydrocarbon of from about 8 to 14 carbon atoms per molecule;
  a diluent wherein the diluent is selected from the group consisting of linear and branched paraffin and cycloparaffin hydrocarbons of 4 to 12 carbon atoms per molecule;
  an organolithium initiator; and
  optionally an ether or a tertiary amine.

35. The method of claim 34 wherein the diluent is selected from the group consisting of 2,3-dimethylbutane, n-heptane, methylcyclopentane, 2,2,4-trimethylpentane and cyclohexane;
  wherein the organolithium initiator is represented by the formula R"Li$_x$ wherein R" is selected from the group consisting of an aliphatic, alicyclic and aromatic radical of from 1 to 20 carbon atoms per radical, x is an integer of from 1 to 4 and the valence of R" is equal to x; or
  wherein the organolithium initiator is represented by the formula

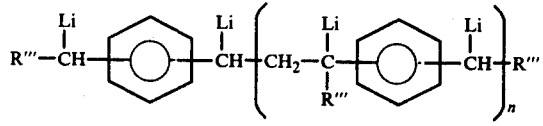

wherein R''' is a linear or branched alkyl containing 2 to 12 carbon atoms, and n is an integer from 0 to 2.

36. The method of claim 35 wherein the ratio by weight of vinylaromatic compound to 1,3-cyclodiene is in the range of from about 99:1 to 1:99.

37. The method of claim 36 wherein the ratio by weight of vinylaromatic compound to 1,3-cyclodiene is in the range of from about 95:5 to 25:75.

38. The method of claim 37 wherein the amount of said ether or said tertiary amine is in the range of from about 0.01 to 50 parts per hundred parts monomers and said polymerization is carried out at a temperature in the range of from about 0 to 300° F.

39. The method of claim 38 wherein said ether is tetrahydrofuran or the tertiary amine is N,N,N',N'-tetramethylethylenediamine in the range of from about 0.1 to 10 parts per hundred parts monomers and said polymerization is carried out at a temperature in the range of from about 30 to 150° F.

40. The method of claim 34 wherein said polymerization is carried out at autogeneous pressure.

41. The method of claim 34 wherein said polymerization is carried out at a pressure sufficient to maintain a reaction mixture substantially in a liquid state.

42. The method of claim 39 wherein 1,3-cyclohexadiene and styrene are polymerized in the presence of n-butyllithium or primarily 1,3-bis-(1-lithio-3-methylpentyl)benzene.

43. The method of claim 42 wherein the copolymer produced is a block copolymer of the form styrene-styrene/1,3-cyclohexadiene-1,3-cyclohexadiene.

44. A method for the production of a 1,3-cyclodiene/vinylaromatic copolymer which comprises polymerizing a 1,3-cyclodiene comonomer and a vincylaromatic hydrocarbon comonomer in a reaction mixture consisting essentially of the 1,3-cyclodiene comonomer represented by the formula

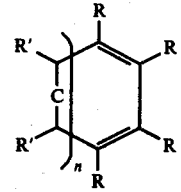

wherein n is 1 or 2, R is selected from the group consisting of a hydrogen, methyl or ethyl radical and R' is selected from the group consisting of a hydrogen, alkyl, cycloalkyl, and aryl radical with a maximum of 6 carbon atoms per R' group;
the vinylaromatic hydrocarbon comonomer of from about 8 to 14 carbon atoms per molecule;
a diluent, wherein the diluent is selected from the group consisting of linear and branched paraffin and cycloparaffin hydrocarbons of 4 to 12 carbon atoms per molecule;
an organolithium initiator; and
optionally an ether or a tertiary amine.

* * * * *

UNITED STATES PATENT AND TRADEMARK OFFICE
CERTIFICATE OF CORRECTION

PATENT NO. : 4,138,536
DATED : February 6, 1979
INVENTOR(S) : Henry L. Hsieh

It is certified that error appears in the above-identified patent and that said Letters Patent are hereby corrected as shown below:

Column 16, lines 5-11; lines 40-46; Column 20, lines 35-41: The formula

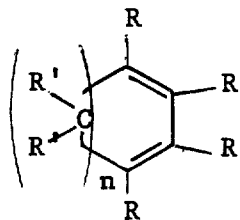   should read ---   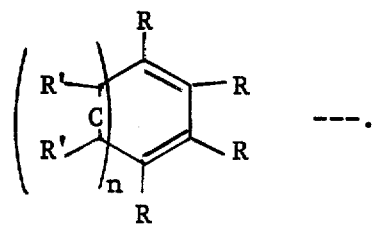   ---.

Column 16, line 31, "tertiary" should be substituted for "tetiary"; line 53, "R'O" should read "R'".

Column 17, line 4; column 18, line 12; column 21, line 4, the portion of the formula shown as:

   should appear ---   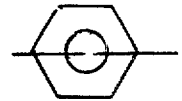   ---.

Signed and Sealed this

Twenty-second Day of May 1979

[SEAL]

Attest:

RUTH C. MASON
Attesting Officer

DONALD W. BANNER
Commissioner of Patents and Trademarks